(12) United States Patent
Giacobbe (10) Patent No.: US 7,494,533 B2
(45) Date of Patent: Feb. 24, 2009

(54) SYSTEMS FOR PURIFYING GASES HAVING ORGANIC IMPURITIES USING GRANULATED POROUS GLASS

(75) Inventor: Frederick W. Giacobbe, Naperville, IL (US)

(73) Assignee: American Air Liquide, Inc., Fremont, CA (US)

( * ) Notice: Subject to any disclaimer, the term of this patent is extended or adjusted under 35 U.S.C. 154(b) by 428 days.

(21) Appl. No.: 11/322,085

(22) Filed: Dec. 29, 2005

(65) Prior Publication Data

US 2007/0151452 A1    Jul. 5, 2007

(51) Int. Cl.
*B01D 53/04* (2006.01)
(52) U.S. Cl. .................. 96/130; 96/144; 502/407; 422/177
(58) Field of Classification Search .......... 96/108, 96/121, 122, 126–128, 130, 134, 143, 144; 95/90, 141, 143–145, 148, 900; 423/210, 423/245.1; 502/38, 407–413; 422/177; 252/184; 501/39, 54

See application file for complete search history.

(56) References Cited

U.S. PATENT DOCUMENTS

| | | | |
|---|---|---|---|
| 2,106,744 A | | 2/1938 | Hood et al. |
| 2,221,709 A | | 12/1940 | Hood et al. |
| 2,286,275 A | | 6/1942 | Hood et al. |
| 3,252,270 A | * | 5/1966 | Pall et al. .................. 95/143 |
| 3,485,687 A | | 12/1969 | Chapman et al. |
| 3,963,462 A | * | 6/1976 | Golovko et al. ............ 95/103 |
| 4,482,360 A | | 11/1984 | Taketomo et al. |
| 4,583,996 A | | 4/1986 | Sakata et al. |
| 4,689,150 A | | 8/1987 | Abe et al. |
| 4,842,620 A | | 6/1989 | Hammel et al. |
| 4,902,307 A | | 2/1990 | Gavalas et al. |
| 5,160,352 A | | 11/1992 | Najjar et al. |
| 5,310,414 A | | 5/1994 | Najjar et al. |
| 5,614,001 A | | 3/1997 | Kosaka et al. |
| 5,634,354 A | | 6/1997 | Howard et al. |
| 5,753,011 A | | 5/1998 | Sircar et al. |
| 5,945,079 A | | 8/1999 | Mullhaupt et al. |
| 5,958,091 A | | 9/1999 | Sakai et al. |

(Continued)

FOREIGN PATENT DOCUMENTS

DE    41 19 380    1/1992

(Continued)

OTHER PUBLICATIONS

Porous and Reconstructed Glasses, Thomas H. Elmer, Corning, Inc., 1992.

(Continued)

*Primary Examiner*—Frank M Lawrence
(74) *Attorney, Agent, or Firm*—Christopher J. Cronin (57) ABSTRACT

Methods and apparatus for purifying gases having organic impurities, including the use of granulated porous glass. A system for purifying an impure gas includes a source of an impure gas, a purification element operatively associated with the source of impure gas for purifying the impure gas, and a conduit operatively associated with the purification element for receiving a flow of purified impure gas from the purification element and directing the purified impure gas to a container or point of use. The impure gas includes a first gas and an organic compound. The purification element includes a vessel containing a packed bed of granulated porous glass.

16 Claims, 7 Drawing Sheets

U.S. PATENT DOCUMENTS

| | | | |
|---|---|---|---|
| 5,958,098 | A | 9/1999 | Heung |
| 5,989,319 | A | 11/1999 | Kawae et al. |
| 6,066,592 | A | 5/2000 | Kawae et al. |
| 6,074,457 | A | 6/2000 | Anthonis et al. |
| 6,090,289 | A | 7/2000 | Verduijn et al. |
| 6,171,556 | B1 * | 1/2001 | Burk et al. ............... 422/173 |
| 6,231,642 | B1 | 5/2001 | Shelby et al. |
| 6,350,297 | B1 | 2/2002 | Doyle et al. |
| 6,352,578 | B1 * | 3/2002 | Sakata et al. ............... 96/134 |
| 6,527,833 | B1 | 3/2003 | Oyama et al. |
| 6,547,859 | B1 | 4/2003 | Mullhaupt et al. |
| 2003/0000387 | A1 | 1/2003 | Uemura et al. |
| 2004/0127358 | A1 | 7/2004 | Derosa et al. |
| 2007/0107599 | A1 * | 5/2007 | Hoke et al. ............... 96/108 |

FOREIGN PATENT DOCUMENTS

| | | |
|---|---|---|
| EP | 0 763 500 | 3/1997 |
| JP | 58208102 A | 12/1983 |
| JP | 59021502 A | 2/1984 |
| SU | 1 683 806 | 10/1991 |

OTHER PUBLICATIONS

Base VYCOR® 7913, Lighting & Materials, Corning, Inc., 2001.
VYCOR® Brand Porous Glass 7930, Lighting & Materials, Corning, Inc., 2001.
Thermodynamic Properties of Nitrogen Adsorbed on Porous Glass at Cryogenic Temperatures, F.W. Giacobbe, Journal of Colloid and Interface Science, vol. 143, May 1991.
Thermodynamic Properties of Argon Adsorbed on Porous Glass plus Preadsorbed Water, Frederic Giacobbe, et al., Journal of Colloid and Interface Science, vol. 38, No. 1, Jan. 1972.
Demystifying Silica Gel, Steven Weintraub, Object Specialty Group Postprints, vol. 9, 2002.
Methods for Reconditioning Silica Gel, Steven Weintraub, Object Specialty Group Postprints, vol. 9, 2002.
New Logic Research Case Study, Membrane Filtration of Colloidal Silica no date given.
Yang, R.T., Gas Separation by Adsorption Processes, New York, Butterworths, 1987, pp. 18-19.
Greenheck, Product Application Guide, Silica Gel Desiccant, Greenheck Fan Corp., 2000.
Chromatography on Glass of Controlled Pore Size, Dr. Wolfgang, Haller, National Bureau of Standards, vol. 206, 1965.
Solid Phase Biochemistry, Application of Controlled Pore Glass in Solid Phase Biochemistry, Dr. Wolfgang Haller, National Bureau of Standards, pp. 535-597, 1983.
CBM Review, Adsorption Advances, Michael Mitariten, World Coal, Sep. 2002.
Adsorption Isotherms, Dr. mark Osborne, Apr. 2004.
Mass and Heat Transfer Through Fixed and Fluidized Beds, Chemical Engineering Progress, vol. 58, No. 7, Jul. 1962.
Heat and Mass Transfer, Fluid Solid Systems, Bernard W. Gamson, Great Lakes Carbon Corporation, vol. 47, No. 1, Jan. 1951.
Chemical Process Principals, Part Three, Kinetics and Catalysis, J.E. Ahlberg, Chap. XXII, pp. 1084-1093, 1939.
Flow of Gases Through Spherical Packings, James de Acetis, et al., The Technical Institute, vol. 52, No. 12, Dec. 1960.
Adsorption Studies of Vapors in Carbon Packed Towers, H.C. Engel, et al., AIChE, pp. 947-965, Feb. 1942.
Theory of Chromatography, Part 10—Formulae for Diffusion into Spheres and Their Application to Chromatography, Atomic Energy Research, E. Glueckauf, vol. 51, 1955.
Fixed-Bed Drying of Air Using Molecular Sieves, James I. Nutter, et al., Department of Chemical Engineering, vol. 5, 1966.
The Adsorption Isotherms of Methane, Nitrogen, Hydrogen and Their Mixtures on Charcoal at 76°K, A.J. Kidnay, et al., NBS Institute for Materials Research, Cryogenics Divison, pp. 397-408, 1968.
The Kenetics of Adsorption of Methane and Nitrogen from Hydrogen Gas, A.J. Kidnay, et al., NBS Institute for Basic Standards, pp. 41-48, 1969.
The Adsorption Wave, Irving M. Klotz, Department of Chemistry, vol. 39, No. 2, pp. 241-268, Apr. 1946
Separation by Adsorption Methods, Advances in Chemical Engineering, Theodore Vermeulen, Department of Chemical Engineering, vol. 2, pp. 147-208, 1958.
Thermodynamic Properties of Nitrogen Adsorbed on Porous Glass at Cryogenic Temperatures, F.W. Giacobbe, Journal of Colloid and Interface Science, pp. 451-462, vol. 143, No. 2, May 1991.
Adsorption and Desorption on $CO_2$ On Solid Sorbents, Ranjani Siriwardane, et al., U.S. Department of Energy, no date given.
$CO_2$ Adsorption on Carbonaceous Surfaces: A Combined Experimental and Theoretical Study, Alejandro Montoya, Institute of Chemistry, pp. 30-39, 2003.
Characterization of Adsorbents by Energy Profile of Adsorbed Molecules, Alan L. Myers, et al., Department of Chemical Engineering, pp. 73-81, 2001.
Cryogenic Adsorption of Low-Concentration Hydrogen on Charcoal, 5A Molecular Sieve, UOP S-115, ZSM-5 and Wessalith Day, R. Scott Willms, Los Alamos National Laboratory, no date given.
Gas Separation by Pressure Swing Adsorption, J.R. Martin, et al., Union Carbide Corporation, pp. 1071-1086, no date given.
Cryogenic Air Separation: The Last Twenty Years, Advances of Cryogenic Engineering, M. Grenier, et al.,vol. 31, pp. 1063-1070, 1985.
The Kinetics of Adsorption of Methane and Nitrogen form Hydrogen Gas, A.J. Kidnay, et al., Advances in Cryogenin Engineering, vol. 14, pp. 41-48, Aug. 1968.
The Purification of Hydrogen Gas By Physical Adsorption at 76°K, Arthur J. Kidnay, pp. 1-161, Apr. 1968.
International Search Report for PCT/IB2008/051443.

* cited by examiner

SYSTEMS FOR PURIFYING GASES HAVING ORGANIC IMPURITIES USING GRANULATED POROUS GLASS

CROSS-REFERENCE TO RELATED APPLICATIONS

This application is related to pending non-provisional patent application Ser. No. 11/322,098 entitled "Methods for Purifying Gases Having Organic Impurities Using Granulated Porous Glass", filed Dec. 29, 2005 and is incorporated by reference. This application is also related to pending non-provisional patent application Ser. Nos. 11/736,367 and 11/736,395, each filed Apr. 17, 2007.

BACKGROUND

In some applications involving the use of hydrogen, or gas mixtures containing hydrogen, contamination of the process gas (or gases) can occur due to the presence or generation of organic gases, organic vapors, organic mists, or particulate matter during the particular processing application. And, if the initial, relatively pure, process gas (or gas mixture) is used in large volumes, purification and re-use of this gas may be an economic necessity.

Although there is an extensive body of literature covering varying methods of purifying gases, many of these methods are often problematic in dealing with relatively high concentrations of organic contaminants in gas streams containing high concentrations of hydrogen. For example, membrane purifiers can easily and rapidly become so contaminated themselves by the removal of organic vapors and oil mists, that they quickly become ineffective. Even the use of pre-filtration (for example, standard types of cartridge filters or activated carbon beds) to protect membrane type purifiers is often not effective for very long when there are high levels of organic mists or high molecular weight oil contamination within the gas(es) so purified. These kinds of pre-filtration/adsorption schemes can sometimes lead to frequent maintenance or complete replacement of the active filtering means and can also sometimes lead to irreparable deterioration in membrane elements if the contamination eventually "breaks through" any of the pre-filtering devices. One proposed solution includes that disclosed by Kidnay, A. J., Hiza, M. J., and Dickson, P. F., "The Kinetics of Adsorption of Methane and nitrogen from hydrogen Gas", and "Advances in Cryogenic Engineering", Vol. 14, K. D. Timmerhaus (Editor), plenum Press, NY 1969, pp. 41-48 (hereinafter, Kidnay et al.).

Another frequently used method of purifying gases, such as hydrogen or helium, involves cryogenic trapping of impurities entrained within these gases. In this kind of process, contaminants are removed by condensation, or adsorption, or by "freezing out" as solids within a low temperature adsorption bed. Often, at least one adsorption bed employed in using this kind of technique involves the use of activated carbon (or activated charcoal, zeolitic molecular sieves, activated alumina, silica gels, and the like, as well as combinations of these conventional adsorbents) in a low temperature adsorption process [Kidnay et al.]. The main problem with this approach is that it is difficult to regenerate conventional packed bed adsorbents that become saturated or nearly saturated with high molecular weight organic impurities. Typically, high temperature steam must be used in these cases, and then an involved process of moisture removal by inert gas purging, at high temperatures, must follow that kind of regeneration step.

Many adsorbents are used in the field of gas separation, one of which includes silica gel. Silica gel is a granular, highly porous form of silica ($SiO_2$). Generally speaking, it is formed by reaction of a sodium silicate solution with a mineral acid such as HCl or $H_2SO_4$, followed by polymerization of the produced hydrosol. Because of the —OH functional groups, silica gel is a relatively polar material. On the other hand, porous glass is a relatively less polar material in comparison to silica gel.

SUMMARY

An object of the present invention is to provide a system for purifying gases containing an organic impurity that obviates some of the problems that are associated with more conventional approaches.

A system for purifying an impure gas includes a source of an impure gas, a purification element operatively associated with the source of impure gas for purifying the impure gas, and a conduit operatively associated with the purification element for receiving a flow of purified impure gas from the purification element and directing the purified impure gas to a container or point of use. The impure gas includes a first gas and an organic compound. The purification element includes a vessel containing a packed bed of granulated porous glass.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Granulated porous glass has a relatively high adsorption affinity for organic materials in the gaseous state or vapor state and will remove substantially all impurities of this type at relatively low temperatures. Even liquefied organic mists or solid organic particulate material can be trapped by filtration (assisted by adsorption) within a packed bed of granulated porous glass.

This new method of hydrocarbon removal from gases involves the use of one or more packed beds (filled or partially filled) with granulated porous glass. This material may have several different trade names and may be produced by several different companies. It is understood that the physical properties of various brands of porous glass may vary somewhat from brand to brand. These kinds of property variations can typically be compensated for by adjusting the volume amounts of porous glass that may be used in any particular purification application.

One of ordinary skill in the art will understand that the patent literature is replete with teachings of packed beds and devices containing them.

Due to properties of porous glass, it has a relatively high specific surface area due to the presence of pores, voids, micro-cracks, and surface imperfections. Typical BET surface areas of granulated porous glass are about 150 to about 250 $m^2/g$, more particularly, either about 150 to about 200 $m^2/g$ or about 200 to about 250 $m^2/g$. Typical average pore diameters include about 40 Angstroms to about 3000 Angstroms. More particularly, typical average pore diameters include about 40 Angstroms to about 200 Angstroms, about 40 Angstroms to about 60 Angstroms, and about 75 Angstroms to about 3000 Angstroms. Typical non-limiting examples of porous glass compositions include: more than about 94% wt. of $SiO_2$, about 4% wt. to about 6% wt. of $B_2O_3$, and about 0.25% wt. to about 1% wt. of either $Na_2O$ or $K_2O$; more than about 94% wt. of $SiO_2$, less than 6% wt. of $B_2O_3$, and less than about 1% wt. of either $Na_2O$ or $K_2O$ with the total wt. %'s of each of the $SiO_2$, $B_2O_3$, and $Na_2O$ or $K_2O$ essentially equal about 100; and more than about 94% wt. of $SiO_2$, about 2% wt. to about 6% wt. of $B_2O_3$, and about 0.025% wt. to about 0.25% wt. of either $Na_2O$ or $K_2O$.

Porous glass may be produced from glass having two phases (one soluble in acid and one insoluble in acid). The soluble phase is leached out of the glass with an acid leaving the insoluble portion behind. U.S. Pat. Nos. 2,106,744, 2,221,709, 2,286,275, and 3,485,687 contain lengthy descriptions of how to prepare porous glass, the contents of which are incorporated by reference. One type of porous glass called controlled porosity glass (CPG) may be obtained from Prime Synthesis, Inc. (2 New Road, Suite 126, Aston, Pa. 19014) under the product name of Native-00500-CPG or Native-01000-CPG. Porous glasses may also be obtained from Corning Inc. (One Riverfront Plaza, Corning, N.Y. 14831) under the product name of Vycor 7930.

The impure gas which is to be purified contains at least a first gas and an organic impurity. Some non-limiting examples of the first gas include carbon dioxide, oxygen, nitrogen, hydrogen, germane, silane, disilane, trisilane, ammonia, helium, neon, argon, and mixtures of two or more thereof. The method of the invention is especially applicable to impure gases containing at least 10% by volume hydrogen up to less than 100% by volume. Hydrogen may also be present at a relatively higher concentration range such as at least 50% by volume up to less than 100% by volume.

The organic impurities may be gaseous in form, vaporous in form, mist-like in form, or they may even be in particulate form. While it is believed that the method invention may be used purify gases having non-hydrocarbon impurities, it is especially useful for removing hydrocarbons. Such non-limiting examples of such hydrocarbons include $CH_4$, $C_2H_6$, $C_3H_8$, $C_4H_{10}$, and straight chain alkanes, or cycloalkanes having 5-9 carbon atoms, or straight chain alkanes, or cycloalkanes, or aromatic alkanes having 10-70 carbon atoms.

Practice of the invention involves flow of an impure gas including a first gas and an organic compound into a packed bed of granulated porous glass. Because of the relatively high adsorption affinity of porous glass for organic materials in the gaseous state or vapor state, the organic compound is preferentially adsorbed thereupon, thereby reducing the concentration of the organic compound in the impure gas and purifying it. The thus-purified impure gas is allowed to flow out of the packed bed.

Two or more packed beds of porous glass can be used so that one or more packed beds can be "off-line" while undergoing a regeneration process while other packed beds can be "on-line" and actively participating in the purification process. One of ordinary skill in the art will understand that regeneration in this context involves removal of at least some of the organic compound adsorbed on the porous glass thereby increasing its ability to adsorb the organic compound and consequently its ability to purify the impure gas.

The packed bed(s) may be regenerated with a purge gas. Typical purge gases include oxygen, carbon dioxide, nitrogen, hydrogen, germane, silane, disilane, trisilane, ammonia, helium, neon, argon, and mixtures of two or more thereof.

In the case of germane, silane, disilane, trisilane, and ammonia, these gases would be used as a purge gas only when they would be compatible with the impure gas to be purified. As one example, ammonia purge gas is particularly appropriate when the impure gas contains ammonia. Another typical purge gas would be the purified impure gas itself. This could be the purified gas exiting another packed bed(s) or from a vessel containing the purified gas. The purge gas may be heated before or during regeneration of the packed bed. Relatively higher temperatures will enhance desorption.

Preferably, the packed bed is regenerated with an oxygen-containing gas. Typical oxygen-containing gases include air and inert gases slightly enriched with oxygen. By action of the oxygen-containing gas flowing into the packed bed, the organic compound may be oxidized and/or desorbed. In the case of hydrocarbons, oxidation would yield $CO_2$ and $H_2O$. Preferably, enough oxygen in the oxygen-containing gas is allowed to react with the organic compound in order to completely oxidize it. The speed of the oxidation process can be significantly influenced by the concentration of oxygen in the regeneration gas and the temperature conditions that are permitted to exist during the regeneration process. Typically, the temperature of the oxygen-containing gas is at least 100° C.

One advantage of the invention is that regeneration of the packed bed may be carried out at temperatures higher than that achievable with activated carbon (or other ignitable materials) thereby allowing improved performance in hydrocarbon removal from the packed bed. For instance, temperatures in excess of 450° C. may be used to regenerate the packed bed without causing any significant degradation.

If necessary, the impure gas stream may be pressurized. The impure gas stream may also be cooled by exchanging heat with a purified gas stream (or by some other cooling means). It is useful to filter the impure gas before it enters the packed bed and/or filter the purified gas after it exits the packed bed. After purification, the purified gas by be stored for later use, immediately re-used as a purge gas, or be used at a point-of-use in a separate process requiring the purified gas.

Figure 1:
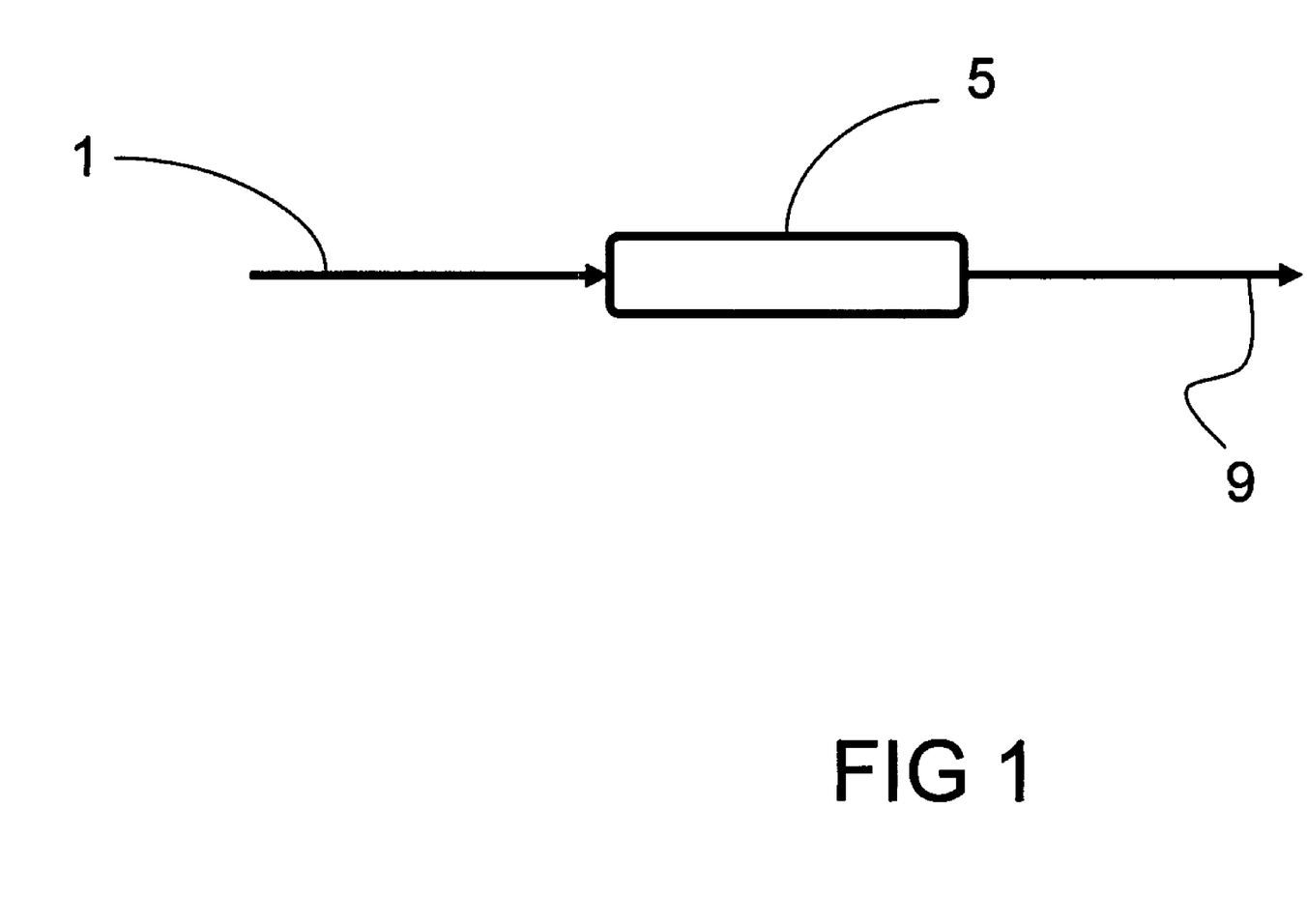
FIG. 1 illustrates an embodiment of the invention.

As best illustrated by FIG. 1, one embodiment of the invention includes a purification element 5 containing a packed bed of porous glass and a conduit 9. An impure gas 1 flows into purification element 5 and the purified gas flows out of the purification element 5 and conduit 9.

Figure 2:
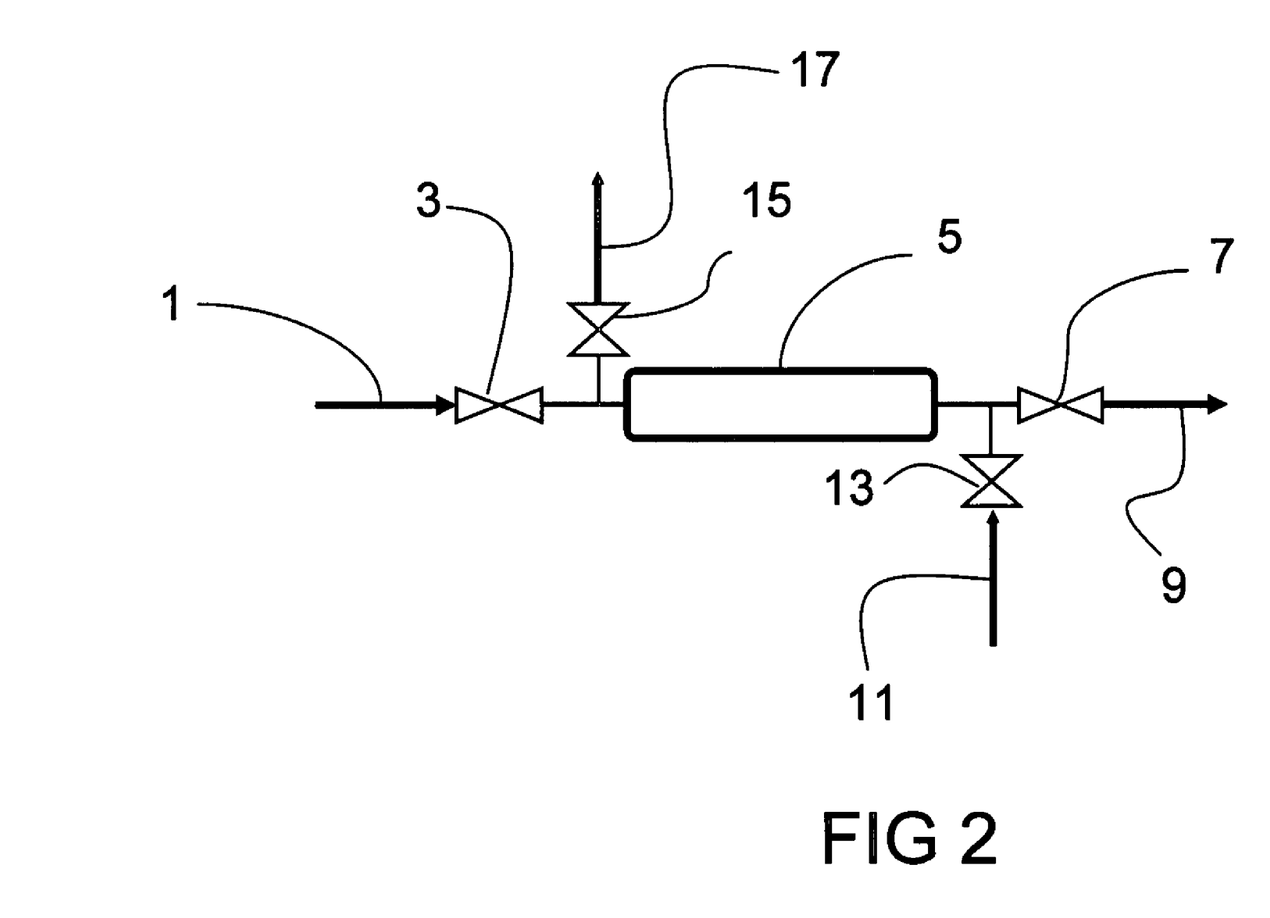
FIG. 2 illustrates another embodiment of the invention including a purge gas.

As best shown by FIG. 2, another embodiment of the invention includes valves 3, 11, 13, 15, and conduit 9. During a purification step, the impure gas 1 flows through open valve 3 and into the purification element 5 while valves 13, 15 are closed. The purified gas flows through valve 7 and out conduit 9. During a regeneration step, the purge gas 11 flows through open valve 13 and into purification element 5, while valve 7 is closed. A mixture of the purge gas and the organic impurity flows through open valve 15 and out conduit 7, while valve 3 is closed.

Figure 3:
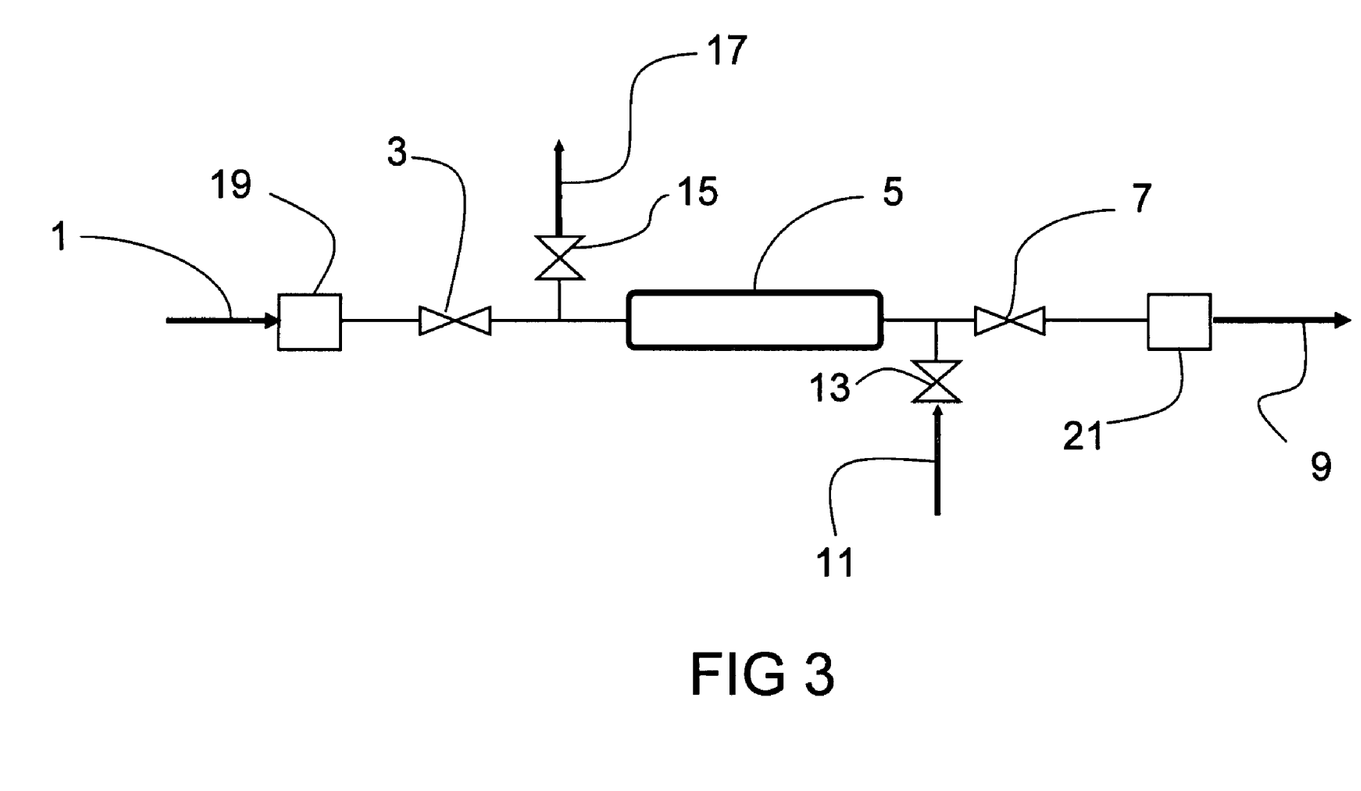
FIG. 3 illustrates another embodiment of the invention including a purge gas and one configuration of filters.

As best depicted in FIG. 3, another embodiment of the invention includes filters 19, 21. During a purification step, the impure gas 1 flows through open valve 3, filter 19 and into the purification element 5 while valves 13, 15 are closed. The purified gas flows through filter 21, valve 7 and out conduit 9. During a regeneration step, the purge gas 11 flows through open valve 13, filter 21 and into purification element 5, while valve 7 is closed. A mixture of the purge gas and the organic impurity flows through filter 19, open valve 15 and out conduit 7, while valve 7 is closed.

Figure 4:
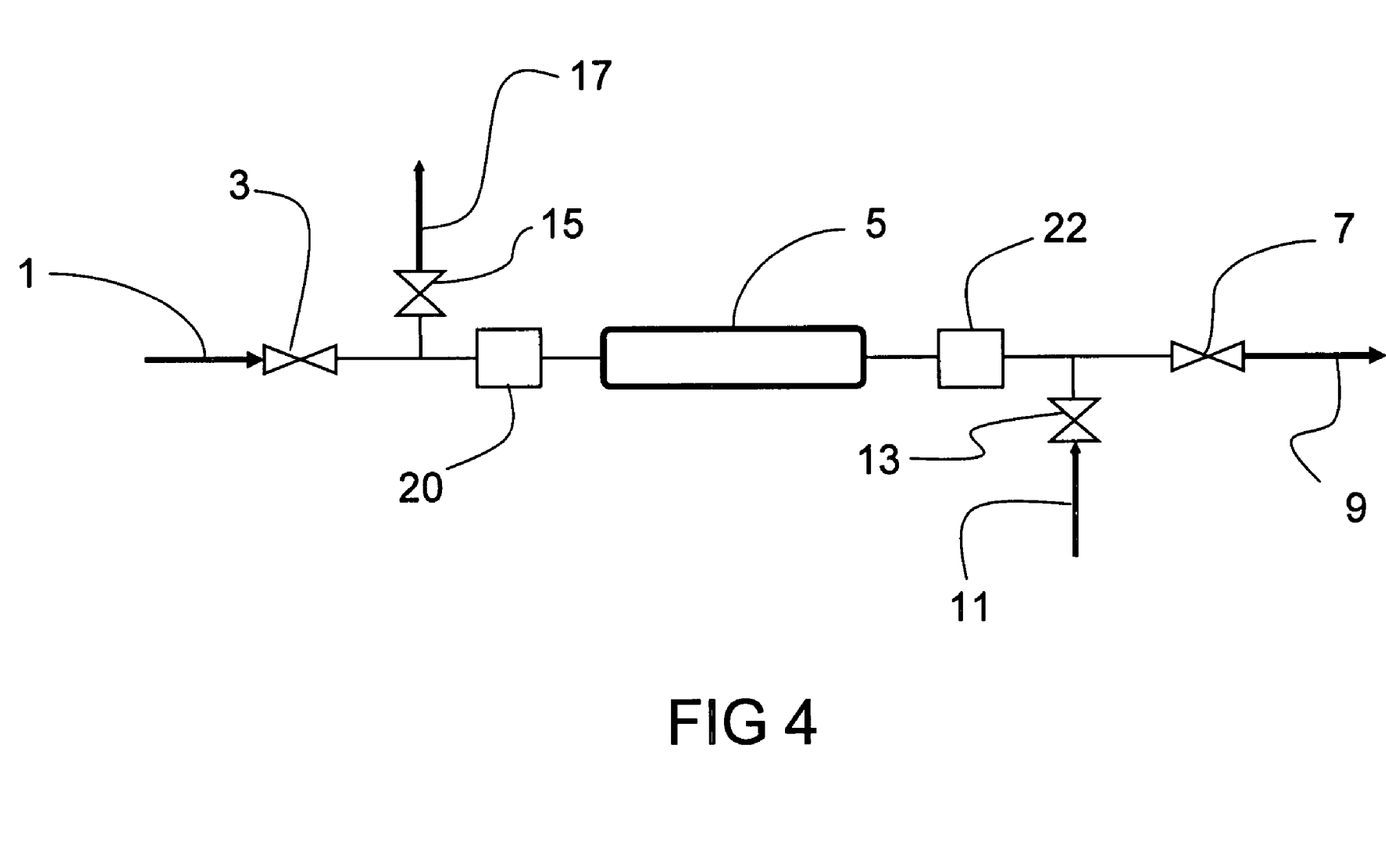
FIG. 4 illustrates another embodiment of the invention including another configuration of a purge gas and filters.

As best illustrated in FIG. 4, another embodiment of the invention includes filters 20 and 22. During a purification step, the impure gas 1 flows through open valve 3, filter 20 and into the purification element 5 while valves 13, 15 are closed. The purified gas flows through filter 22, valve 7 and out conduit 9. During a regeneration step, the purge gas 11 flows through open valve 13, filter 22 and into purification element 5 while valve 7 is closed. A mixture of the purge gas and the organic impurity flows through filter 20, open valve 15 and out conduit 7, while valve 3 is closed.

Figure 5:
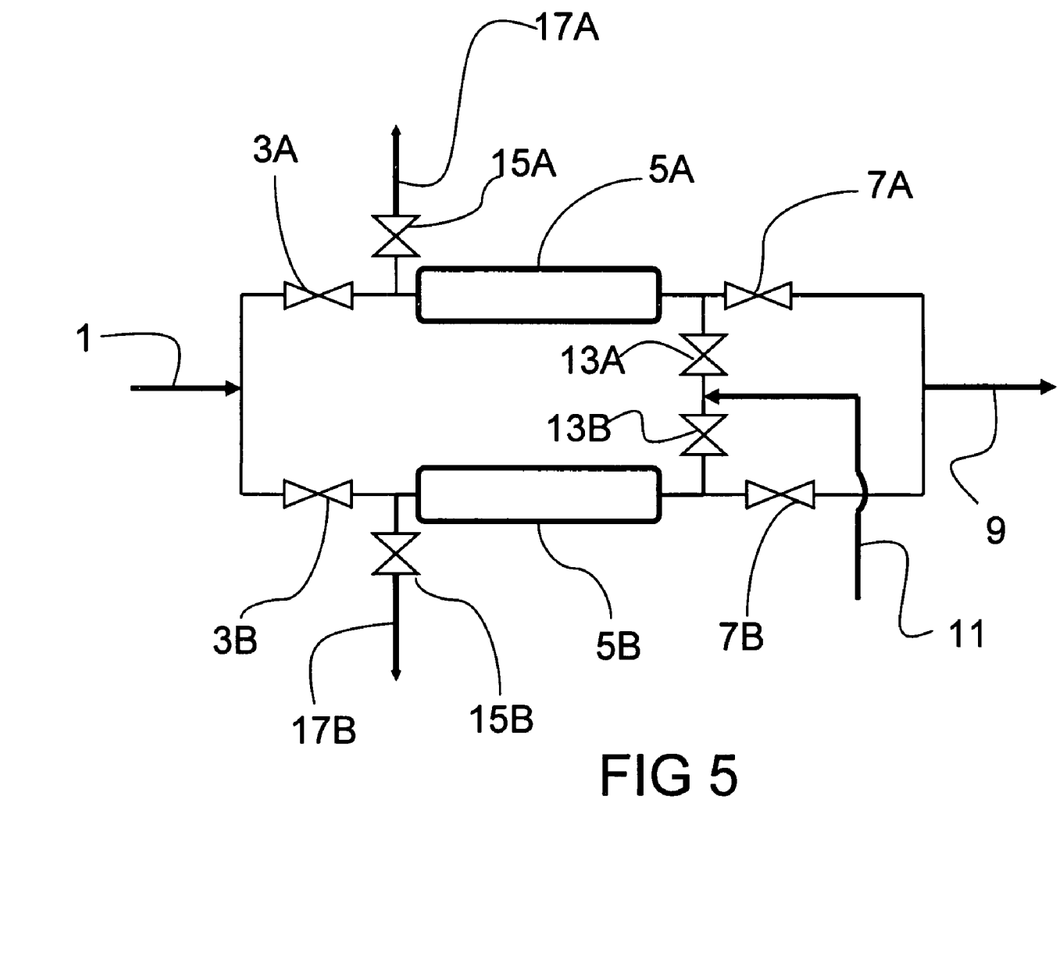
FIG. 5 illustrates another embodiment of the invention including two purification elements to allow alternating flows of impure gas and purge gas.

As best shown in FIG. 5, another embodiment of the invention includes valves 3A, 3B, 15A, 15B, 13A, 13B, 7A, and 7B and conduits 17A and 17B. In a first stage, the impure gas 1 flows through open valve 3A and into purification element 5A while valves 3B and 15A are closed. The purified gas flows through open valve 7A and out conduit 9 while valves 13A and 7B are closed. Contemporaneously with this purification step of the first stage, the purge gas 11 flows through open valve 13B and into purification element 5B while valves 13A and 7A are closed. The mixture of purge gas and organic impurity flows out of purification element 5B and through open valve 15B and conduit 17B while valve 3B is closed. In a second stage, valves 3A, 17B, 13A, 13B, and 17A are closed and valves 3B, 7B, 13A, and 15A are opened. The impure gas 1 flows through open valve 3B and into purification element 5B while valves 3A and 15B are closed. The purified gas flows through open valve 7B and out conduit 9 while valves 13B and 7A are closed. Contemporaneously with this purification step of the second stage, the purge gas 11 flows through open valve 13A and into purification element 5A while valves 13B and 7A are closed. The mixture of purge gas and organic impurity flows out of purification element 5A and through open valve 15A and conduit 17A while valve 3A is closed.

Figure 6:
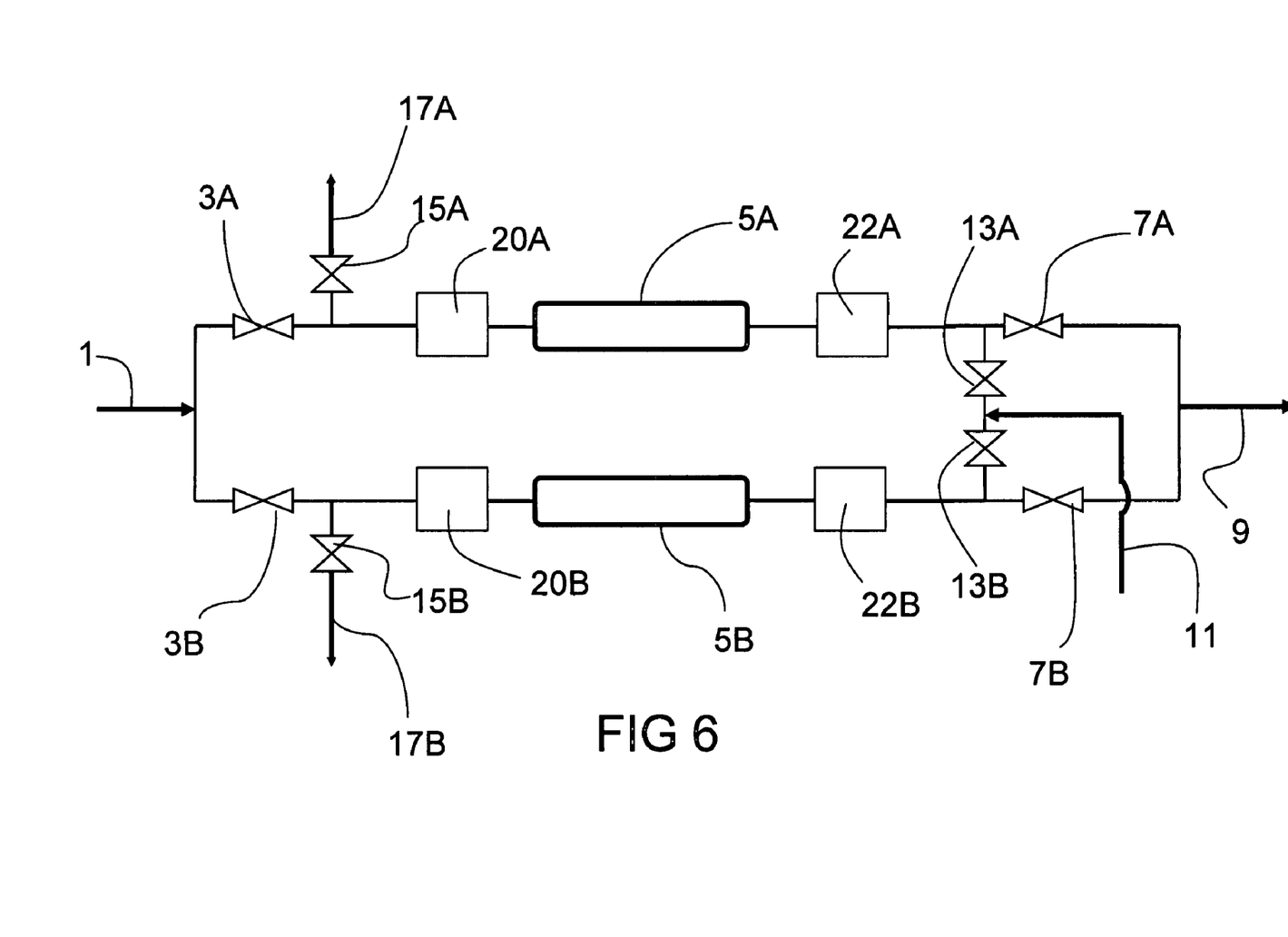
FIG. 6 illustrates another embodiment of the invention including two purification elements to allow alternating flows of impure gas and purge gas as well as one configuration of filters.

As best depicted in FIG. 6, another embodiment of the invention includes filters 20A, 20B, 22A, and 22B. In a first stage, the impure gas 1 flows through open valve 3A, filter 20A, and into purification element 5A while valves 3B and 15A are closed. The purified gas flows through open filter 22A, valve 7A, and out conduit 9 while valves 13A and 7B are closed. Contemporaneously with this purification step of the first stage, the purge gas 11 flows through open valve 13B, filter 22B, and into purification element 5B while valves 13A and 7B are closed. The mixture of purge gas and organic impurity flows out of purification element 5B and through filter 20B, open valve 15B and conduit 17B while valve 3B is closed. In a second stage, valves 3A, 17B, 13A, 13B, and 17A are closed and valves 3B, 7B, 13A, and 15A are opened. The impure gas 1 flows through open valve 3B, filter 20B, and into purification element 5B while valves 3A and 15B are closed. The purified gas flows through filter 22B, open valve 7B and out conduit 9 while valves 13B and 7A are closed. Contemporaneously with this purification step of the second stage, the purge gas 11 flows through open valve 13A, filter 22A, and into purification element 5A while valves 13B and 7A are closed. The mixture of purge gas and organic impurity flows out of purification element 5A and through filter 20A, open valve 15A, and conduit 17A while valve 3A is closed.

Figure 7:
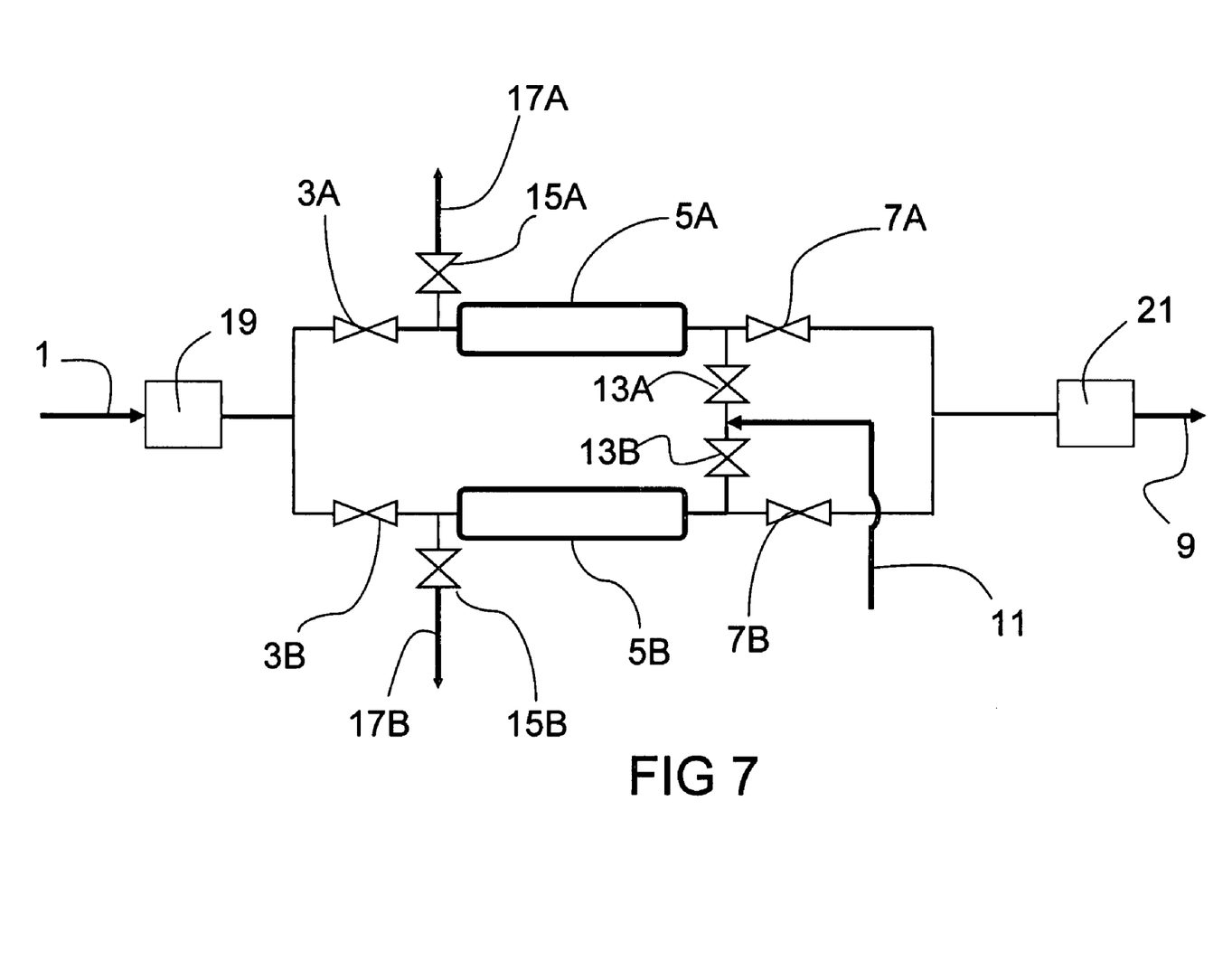
FIG. 7 illustrates another embodiment of the invention including two purification elements to allow alternating flows of impure gas and purge gas as well as another configuration of filters.

Another embodiment of the invention is best illustrated in FIG. 7. In a first stage, the impure gas 1 flows through filter 19, open valve 3A, and into purification element 5A while valves 3B and 15A are closed. The purified gas flows through open valve 7A, filter 21, and out conduit 9 while valves 13A and 7B are closed. Contemporaneously with this purification step of the first stage, the purge gas 11 flows through open valve 13B and into purification element 5B while valves 13A and 7B are closed. The mixture of purge gas and organic impurity flows out of purification element 5B and through open valve 15B and conduit 17B while valve 3B is closed. In a second stage, valves 3A, 17B, 13A, 13B, and 17A are closed and valves 3B, 7B, 13A, and 15A are opened. The impure gas 1 flows through filter 19, open valve 3B and into purification element 5B while valves 3A and 15B are closed. The purified gas flows through open valve 7B, filter 21, and out conduit 9 while valves 13B and 7A are closed. Contemporaneously with this purification step of the second stage, the purge gas 11 flows through open valve 13A and into purification element 5A while valves 13B and 7A are closed. The mixture of purge gas and organic impurity flows out of purification element 5A and through open valve 15A and conduit 17A while valve 3A is closed.

In each of the embodiments, a heating element may be used to heat the purge gas. Also, a control element may be used to control the opening and closing of the various valves as well as controlling flows of the impure gas and purge gas.

EXAMPLES

A sample of Corning Vycor Porous Glass (No. 7930) was deliberately contaminated with a source of gaseous hydrocarbons in air and at ambient temperatures until its color changed from clear and grasslike to a yellow/amber color. This material was then heat treated at 450±5° C. in a flowing substantially pure gaseous nitrogen atmosphere for five days. Then, this sample of porous glass was exposed to a flowing gaseous mixture consisting of 20% oxygen/80% nitrogen, at about one atmosphere, and at regeneration temperatures of 450±5° C. for one additional day. These processing conditions eliminated all traces of the organic contamination.

A subsequent measurement of the BET surface area of this material produced a result of 218 $m^2/g$ at 77.3° K, indicating no significant alteration in the originally specified surface area of this material. The length of the regeneration test noted above was deliberately extended in order to prove that the effective internal and external surface area of the porous glass would not be compromised by high temperatures or long heating times. In other words, the pore volume and surface area of the crushed or porous glass is not affected by high temperatures that might be used in a regeneration process. Much shorter and similarly effective regeneration times at temperatures at or above 450° C., are also possible.

The high temperature regeneration process indicated above might not be possible using other type of less inert adsorbent materials. For example, a packed bed containing activated carbon (or charcoal) is very likely to begin burning (internally) under the same temperature and oxygen partial pressure condition, thus completely destroying the packed bed as well as the containment vessel. Other types of adsorbents would be either damaged by these hostile conditions (e.g., silica gel) or their inherent surface areas are very small relative to porous glass (e.g., alumina). In this case, their containment vessels would have to be extremely large in order to allow the same adsorption/absorption capacity as a much smaller containment vessel containing activated porous glass.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A system for purifying an impure gas, comprising:
   a) a source of an impure gas comprising a first gas and an organic compound;
   b) a purification element operatively associated with said source of impure gas for purifying said impure gas, said purification element comprising a vessel containing a packed bed of granulated porous glass, said porous glass having an average pore diameter in a range of from about 40 Angstroms to about 3000 Angstroms;
   c) a source of purge gas operatively associated with said purification element for purging said organic compound from said purification element; and
   d) a conduit operatively associated with said purification element for receiving a flow of purified impure gas from said purification element and directing said purified impure gas to a container or point of use.

2. The system of claim 1, wherein said granulated porous glass has a BET surface area of about 150 to about 200 m²/g.

3. The system of claim 1, wherein said granulated porous glass has a BET surface area of about 200 to about 250 m²/g.

4. The system of claim 1, wherein said granulated porous glass has an average pore diameter of from about 40 Angstroms to about 200 Angatroms.

5. The system of claim 1, wherein said granulated porous glass has an average pore diameter of from about 40 Angstroms to about 60 Angstroms.

6. The system of claim 1, wherein said granulated porous glass has an average pore diameter of from about 75 Angstroms to about 3000 Angstroms.

7. The system of claim 1, wherein said granulated porous glass has a composition comprising more than about 94% wt. of $SiO_2$, about 4% wt. to about 6% wt. $B_2O_3$, and about 0.25% wt. to about 1% wt. $R_2O$, wherein R is Na or K.

8. The system of claim 1, wherein said granulated porous glass has a composition consists essentially of more than about 94% wt. of $SiO_2$, less than about 6% wt. $B_2O_3$, and less than about 1% wt. $R_2O$, wherein R is Na or K.

9. The system of claim 1, wherein said granulated porous glass has a composition comprising more than about 94% wt. $SiO_2$, about 2% wt. to about 6% wt. $B_2O_3$, and about 0.05% wt. to about 0.25% wt. $R_2O$, wherein R is Na or K.

10. The system of claim 1, wherein said purge gas comprises an oxygen-containing gas.

11. The system of claim 10, further comprising a heating device operatively associated with said oxygen-containing gas for heating said oxygen-containing gas.

12. The system of claim 1, further comprising an inlet filter operatively associated with said source of impure gas and said purification element, said inlet filter being disposed downstream of said source of impure gas and upstream of said purification element, said inlet filter being adapted and configured to filter out solid materials that may be present in said impure gas as said impure gas is allowed to flow into said purification element during operation of said system.

13. The system of claim 1, further comprising an outlet filter operatively associated with said purification element, said outlet filter being disposed downstream of said purification element and being adapted and configured to filter out solid materials that may be present in said impure gas as said impure gas is allowed to flow out of said purification element after being purified thereby during operation of said system.

14. A system for purifying an impure gas, comprising:
   a) a source of an impure gas comprising a first gas and an organic compound;
   b) a source of an oxygen-containing gas;
   c) first and second purification elements operatively associated with said source of impure gas for purifying said impure gas, each of said purification elements comprising a vessel containing a packed bed of granulated porous glass;
   d) a first manifold operatively associated with said source of the impure gas mixture and said first and second purification elements, said first manifold comprising a plurality of conduits and valves configured and adapted to alternatingly allowing flows of said impure gas into said first and second purification elements;
   e) a second manifold operatively associated with said first and second purification elements and said source of oxygen, said second manifold comprising a plurality of conduits and valves configured and adapted for alternatingly allowing flows of said oxygen-containing gas through said first and second packed beds;
   f) a third manifold operatively associated with said first and second purification elements, said third manifold comprising a plurality of conduits and valves configured and adapted to alternatingly allowing flows of the impure gas after purification in said purification elements from said first and second purification elements;
   g) a fourth manifold operatively associated with said first and second purification elements, said fourth manifold comprising a plurality of conduits and valves configured and adapted to alternatingly allowing flows of a mixture of said oxygen-containing gas and oxidation products from said purification elements, the oxidation products being produced by oxidation of the organic compound by said oxygen-containing gas;
   h) a control element operatively associated with said first, second, third, and fourth manifolds being adapted and configured to allow a flow of said impure gas into one of the said purification elements while the oxygen-containing gas is allowed to flow into the other of said purification elements; and
   i) a conduit operatively associated with said third manifold being adapted and configured to receive a flow of the purified impure gas from said third manifold direct said purified impure gas to a container or point of use.

15. A system for removing organic impurities from a hydrogen-containing gas, comprising:
   a) a source of a hydrogen-containing gas having an organic impurity;
   b) a source of an oxygen-containing gas;
   c) a heating element operatively associated with said source of oxygen-containing gas for heating said oxygen-containing gas;
   d) first and second purification elements operatively associated with said source of hydrogen-containing gas for purifying said hydrogen-containing gas, each of said purification elements comprising a vessel containing a packed bed of granulated porous glass, wherein said granulated porous glass has:

i) a composition comprising more than about 94% wt. $SiO_2$, about 2% wt. to about 6% wt. $B_2O_3$, and about 0.05% wt. to about 0.25% wt. $R_2O$, wherein R is Na or K;
   ii) a BET surface area of 150 to 200 $m^2/g$; and
   iii) an average pore diameter of from about 40 Angstroms to about 200 Angstroms;
e) a first manifold operatively associated with said source of said hydrogen-containing gas and said first and second purification elements being configured and adapted to alternatingly allowing flows of said hydrogen-containing gas into said first and second purification elements;
f) a second manifold operatively associated with said first and second purification elements and said source of oxygen configured and adapted for alternatingly allowing flows of said oxygen-containing gas through said first and second packed beds;
g) a control element operatively associated with said first and second manifolds being adapted and configured to allow a flow of said hydrogen-containing gas into one of the said purification elements while said oxygen-containing gas is allowed to flow into the other of said purification elements;
h) at least one inlet filter operatively associated with said source of hydrogen-containing gas and said purification elements, said at least one inlet filter being disposed downstream of said source of hydrogen-containing gas and upstream of said purification elements, said inlet filter being adapted and configured to filter out solid materials that may be present in said source of hydrogen-containing gas as said source of hydrogen-containing gas is allowed to flow into said purification elements during operation of said system;
   i) at least one outlet filter operatively associated with said purification elements, said at least one outlet filter being disposed downstream of said purification elements and being adapted and configured to filter out solid materials that may be present in said hydrogen-containing gas as said hydrogen-containing gas is allowed to flow out of said purification elements after being purified thereby during operation of said system; and
   j) a conduit operatively associated with said second manifold being adapted and configured during operation of said system to:
      i) receive a flow of said hydrogen-containing gas as it is allowed to flow out of said purification elements after being purified thereby; and
      ii) directing said purified hydrogen-containing gas to a container or point of use.

16. The system of claim 15, wherein the organic impurity is a hydrocarbon compound.

* * * * *